United States Patent
Shinagawa et al.

(10) Patent No.: US 6,918,449 B2
(45) Date of Patent: Jul. 19, 2005

(54) MAGNETIC IMPACT TOOL

(75) Inventors: Sou Shinagawa, Moriguchi (JP); Satoshi Nakayama, Hirakata (JP); Fumiaki Sekino, Kashihara (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/807,255

(22) Filed: Mar. 24, 2004

(65) Prior Publication Data

US 2004/0238191 A1 Dec. 2, 2004

(30) Foreign Application Priority Data

Mar. 26, 2003 (JP) ........................................ 2003-086087

(51) Int. Cl.[7] .............................................. B25C 13/00
(52) U.S. Cl. .............................. 173/2; 173/93; 173/117; 173/176; 173/213
(58) Field of Search ........................... 173/2, 93, 93.5, 173/117, 213, 217, 176, 47

(56) References Cited

U.S. PATENT DOCUMENTS

| | | | |
|---|---|---|---|
| 3,150,725 A | | 9/1964 | Hornschuch et al. |
| 3,811,313 A | * | 5/1974 | Schut .......................... 72/430 |
| 5,366,026 A | * | 11/1994 | Maruyama et al. ......... 173/180 |
| 5,497,555 A | * | 3/1996 | Averbukh ..................... 30/362 |
| 5,845,718 A | * | 12/1998 | Cooper et al. .............. 173/176 |
| 6,311,786 B1 | * | 11/2001 | Giardino et al. ................ 173/1 |
| 6,454,021 B1 | * | 9/2002 | Watanabe .................... 173/114 |
| 6,695,070 B1 | * | 2/2004 | Gokturk et al. ................. 173/1 |

FOREIGN PATENT DOCUMENTS

| | | |
|---|---|---|
| JP | 11-333742 | 12/1999 |
| WO | 04-012910 | 2/2004 |

* cited by examiner

*Primary Examiner*—Scott A. Smith
(74) *Attorney, Agent, or Firm*—Greenblum & Bernstein, P.L.C.

(57) ABSTRACT

There is provided a magnetic impact tool comprising a magnetic hammer driven by a motor, a magnetic anvil disposed so as to face the magnetic hammer, an output shaft that rotates together with the magnetic anvil, a magnetic bypass device for distributing magnetic flux between the magnetic anvil and the magnetic hammer, and a changing device for changing the distribution of magnetic flux with the magnetic bypass device, wherein a rotational impact force is magnetically generated in a non-contact manner for the magnetic anvil in conjunction with the rotation of the magnetic hammer. The torque generated between the magnetic hammer and magnetic anvil can be changed by varying the distribution ratio of the magnetic flux from the magnetic hammer to the magnetic anvil and magnetic bypass device by the changing device. Impact action can be generated, and screw tightening and loosening work can be carried out even if a low-torque motor is used. Magnetic impact action can be carried out and the load applied to operator's arm can be lightened even when working with a low-load screw wherein the load torque does not exceed.

10 Claims, 10 Drawing Sheets

MAGNETIC IMPACT TOOL

BACKGROUND OF THE INVENTION

1. Field of the Invention

The present invention relates to a magnetic impact tool for generating impact force through magnetism, and more specifically relates to a technique whereby a large magnetic impact action can be generated using a low-torque motor, and magnetic impact action can be performed even on a low-load screw in which the load torque does not exceed magnetic attraction torque.

2. Description of the Related Art

Conventional impact tools are used in operations in which machine screws are tightened with a bit such as a driver bit, and these tools comprises a hammer that is rotated with rotational force transmitted from a motor, an output shaft that meshes with the hammer and rotates, and a spring for urging the axially movable hammer toward the output shaft, wherein the output shaft is intermittently struck in the direction of hammer rotation and is rotated by means of a meshing portion between the hammer and output shaft. A bit mounted in the front end of the output shaft can thereby be rotated with impact (refer to Japanese Laid-open Patent Publication Hei 11-333742, for example).

However, considerable noise is generated with the impact tool cited in the above-described publication because the hammer and the output shaft directly collide with each other, and this noise is a severe drawback.

In view of the above, the present applicants have previously proposed a magnetic impact tool with which screws are tightened by using magnetic coupling to deliver a strike without any contact, and obtaining a tightening rotational impact force without a collision sound (not previously known). The magnetic impact tool (hereinafter referred to as tool) shown in FIGS. 15 to 17 is now explained as a premise of the present invention. The motor assembly 3 comprises a motor 31 and a reduction gear 32, and an output shaft 33 protrudes from the reduction gear 32. The magnetic hammer 2 comprises four magnets 21, eight pole plates 22 that sandwich the poles from each polar direction, and a cylindrical hammer core 20 having a pole attachment 23 with which the pole plates 22 are held on the peripheral surface. Each magnet 21 is sandwiched by two pole plates 22 and is bonded to the pole attachment 23.

A magnetic anvil 1 is provided that comprises an axle unit 11 that has a bit hole 12 for attaching a tool bit (not depicted) to the tip, and four L-shaped magnetic anvil arms 10. The magnetic anvil arms 10 are disposed at equal intervals along a circumference that is orthogonal to the axle unit 11, and are joined to the axle unit 11 about the center of the circumference. The motor assembly 3, magnetic hammer 2, and magnetic anvil 11 are housed in a case 6, as shown in FIG. 16. The hammer core 20 of the magnetic hammer 2 is inserted and fixed in a drive shaft 33. The magnetic anvil 1 is rotatably supported by bearings 4 in the tip portion of the case 6, and is also rotatably supported at the tip of the drive shaft 33 by hammer bearings 5, which are press-fitted in the center inside the L-shaped magnetic anvil arms 10. The L-shaped magnetic anvil arms 10 are positioned around the outside of the magnetic hammer 2. A grip 7 that is held by the operator is integrally formed on the case 6, and a trigger 8 for operating the magnetic impact tool is provided to the area where the index finger of the operator would be.

In its assembled state, the tool has a minute gap 9 between the magnetic anvil arms 10 and the magnets 21 or magnetic pole plates 22 of the magnetic hammer 2, as shown in FIG. 17, and the magnetic anvil arms 10 and magnetic hammer 2 can rotate without making contact. The operator can start the motor 31 and fasten screws by pulling the trigger 8 with the index finger.

The operation of the above-described tool entails inserting a screw-tightening bit (not depicted) into the bit hole 12 at the tip of the magnetic anvil 1, pressing the screw to the fastened member while causing the screw tightening bit to make contact with the screw, and pulling the trigger 8 to begin driving the tool. In the initial state of screw tightening, the magnetic hammer 2 and the magnetic anvil 1 synchronously rotate to perform screw tightening because the magnetic attraction torque that acts between the magnetic hammer 2 and the magnetic anvil 1 is greater than the torque required for screw tightening. When the torque required for screw tightening is greater than the magnetic attraction torque of the magnetic hammer 2 and magnetic anvil 1, the torque of the motor assembly 3 and the inertia torque are applied, the magnetic hammer 2 and magnetic anvil 1 are not synchronized any longer, a magnetic impact condition is established, and screw tightening is completed with impact torque.

SUMMARY OF THE INVENTION

In a tool such as the one described above, the magnetic impact torque generated during each magnetic impact operation is substantially constant at a constant rotational speed. Therefore, in the screw-tightening work, because the load torque is initially low, the magnetic hammer 2 and magnetic anvil 1 begin to rotate together without performing magnetic impact action, and when the load torque exceeds the magnetic attraction torque of the magnetic hammer 2 and magnetic anvil 1, the magnetic attraction of the magnetic hammer 2 and magnetic anvil 1 is overcome by the resultant force of the torque and inertial force of the magnetic hammer 2 or the motor assembly 3 that drives it, and impact action is started.

However, (1) the inertial force of motor assembly 3 cannot be used when the screw is locked and is further tightened from a condition in which the stalling torque of the motor assembly 3 has been exceeded, or when the locked screw is loosened, so magnetic impact action does not occur and tightening and loosening work cannot be carried out. Because of this, the stalling torque of the motor assembly 3 that drives the magnetic hammer 2 must be made equal to or greater than the attraction torque, and a large motor 31 therefore becomes necessary. (2) In the case of a thin screw, the load torque from the screw never exceeds the magnetic attraction torque, so the operator constantly receives a big reaction force to the arm, and the arm is tired. In addition to these drawbacks, a large reaction force is applied to the arm when the screw becomes seated.

The present invention is designed to solve such drawbacks, and an object thereof is to provide a magnetic impact tool that is capable of producing a large magnetic impact action even if a motor with a low stalling torque is used, that is capable of performing work in which a screw is further tightened or loosened, and that is capable of reducing the load on the arm by allowing magnetic impact action to occur even with a screw in which the load torque does not exceed the magnetic attraction torque.

In order to achieve the above-stated object, the present invention provides a magnetic impact tool for magnetically generating a rotational impact force in a non-contact manner, comprising: a motor for generating rotational force, a drive shaft rotatably driven by the motor, a magnetic hammer rotatably moved in a coupled state with the drive shaft, a magnetic anvil which faces the magnetic hammer and to which the rotational force is transmitted by magnetic coupling, with one of the opposing surfaces of the magnetic hammer and magnetic anvil having a magnetic pole, and the other having a magnetic pole or magnetic body; an output shaft rotated by the magnetic anvil; magnetic bypass means for bypassing the magnetic flux between the magnetic anvil and the magnetic hammer, and changing the state of magnetic coupling therebetween, and changing means for changing the bypass quantity of the magnetic flux with the magnetic bypass means, with the torque transmitted from the magnetic hammer to the magnetic anvil being changed in accordance with the change in bypass quantity of the magnetic flux varied by the changing means.

According to the present invention, the magnetic attraction torque can be reduced, the quantity of magnetic flux that flows from the magnetic hammer to the magnetic anvil can be adjusted, then the magnetic impact action can be brought about even with a lower screw-tightening load, for example. Also, if the distribution ratio of the magnetic flux flowing to the magnetic bypass device at a time of motor startup is increased and the distribution ratio of the magnetic flux flowing toward the magnetic anvil is reduced, for example, the magnetic attraction torque can be reduced, and the tool can be started even by a motor with a low stalling torque, then the motor can be made smaller. Furthermore, if the distance by which the magnetic bypass device approaches the magnetic hammer is adjusted, the reaction force to the arm can be kept low and, screw-tightening work can be facilitated because a magnetic impact action can be brought about even with a thin screw.

The above-described magnetic bypass device may comprise a magnetic plate, and may be configured to allow the plate to move toward or away from the magnetic hammer. The impact torque can thereby be changed without varying the gap between the magnetic hammer and the magnetic anvil. The need to position moving parts for changing the gap in areas that require strength is therefore eliminated, and the configuration can be simplified.

The above-described plate serving as the magnetic bypass device may be configured to be able to move in the axial direction of the drive shaft. The need for the plate to have a rotating structure is thereby eliminated, and the configuration can be simplified.

The plate serving as the magnetic bypass device may be configured so as to be able to tilt about an axis that is orthogonal to the axial center of the magnetic hammer shaft. The need to restrain the plate in a manner such that it moves only in the axial direction of the magnetic hammer is thereby eliminated, and the configuration can be simplified.

The magnetic bypass device may be configured to take the form of a spiral spring that is elastically deformable in the axial direction of the magnetic hammer, wherein one end is positioned close to the end face of the magnetic hammer, and the other end is configured to be able to be pulled and moved by the changing device. Owing to the elasticity of the magnetic bypass device, the action of the magnetic bypass device is thereby synchronized with the changing device, and the changing device operates so as to be returned to its initial position, then the configuration of the changing device can be simplified.

The magnetic bypass device may also be configured to be able to be moved by the changing device toward or away from the magnetic hammer in a radial direction that is orthogonal to the axial center of the magnetic hammer. The total length of the tool can thereby be shortened, and the tool can be made easier to handle, then operability in narrow areas can be improved in comparison with a configuration whereby the magnetic bypass device moves in the axial direction of the magnetic hammer.

The changing device may also be adapted to act by way of the centrifugal force of the rotation produced by the motor. The changing device can thereby automatically change the distribution ratio of the magnetic flux produced by the magnetic bypass device in accordance with the rotational speed of the motor, increase the magnetic impact torque during times of high rotational speed, decrease the magnetic impact torque during times of low rotational speed, and optimally maintain work efficiency irrespective of whether the required torque is high or low.

The changing device may be configured such that the magnetic bypass device moves in coordination with the trigger for setting the output of the motor. The trigger for setting the output of the motor can thereby be operated in accordance with the intention of the operator, and the magnetic impact torque can be freely controlled.

The plate serving as the magnetic bypass device may take a substantially conical shape that protrudes toward the magnetic hammer. The opposing surface areas of the magnetic hammer and the magnetic bypass device are thereby increased, and the distribution ratio of the magnetic flux from the magnetic hammer to the magnetic bypass device and magnetic anvil can be varied considerably. As a result, the range of magnetic impact torques can be expanded from very low to very high, a tool that is capable of handling very thin to very thick screws can be obtained, and there is no need for the operator to carry several types of power tools.

The changing device may be adapted to allow the movement distance and movement timing of the magnetic bypass device to be set in accordance with the force with which the tool is pressed to the object to be fastened. The magnetic impact torque is thereby increased when the pressing force is high, the magnetic impact torque is reduced when the pressing force is low, and the user interface between the operator and the tool is improved.

DESCRIPTION OF THE PREFERRED EMBODIMENTS

Embodiments of the present invention are described below with reference to the drawings.

(First Embodiment)

Figure 1:
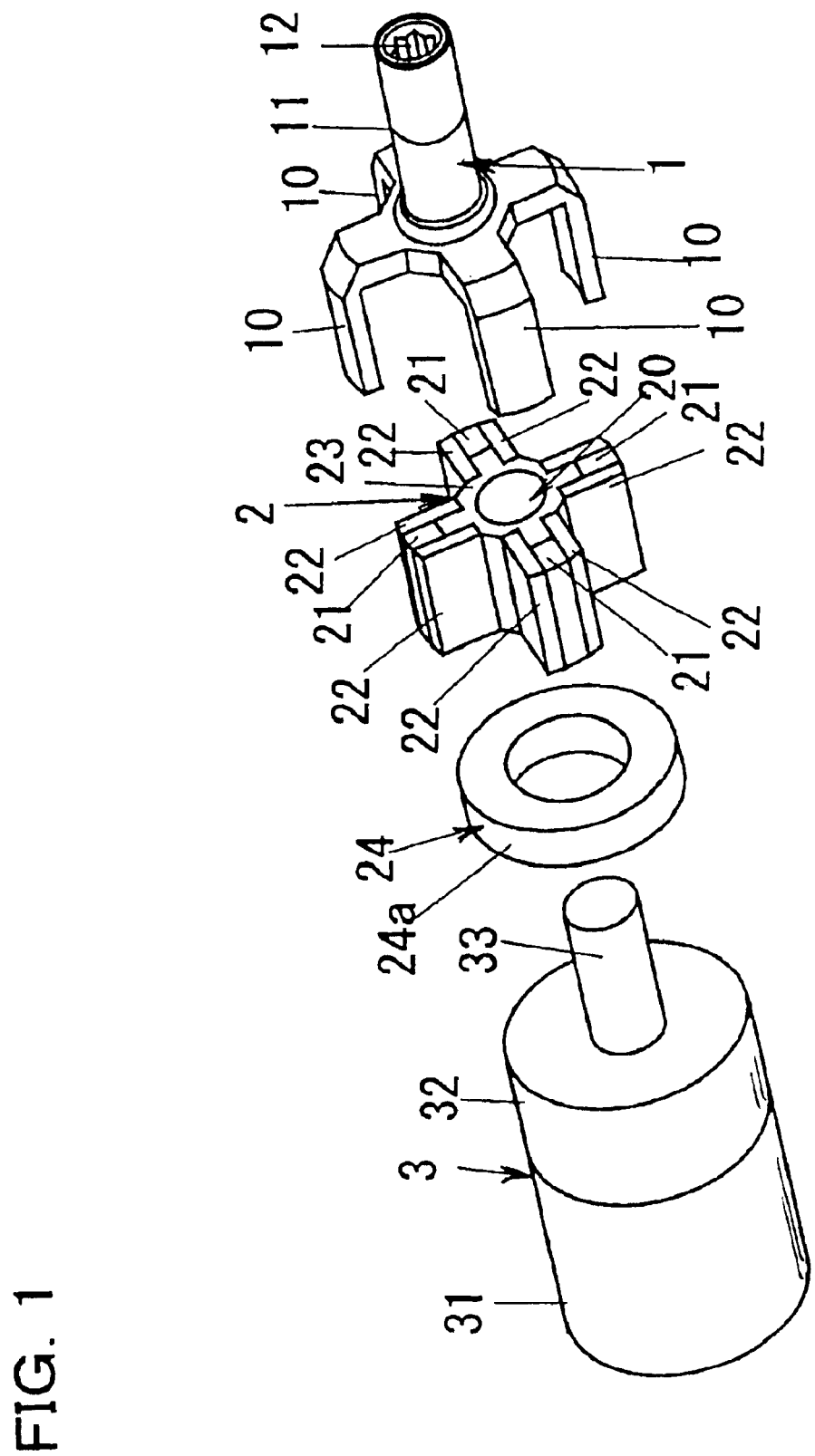
FIG. 1 is an exploded perspective view showing the internal structure of the magnetic impact tool according to the first embodiment of the present invention.
Figure 2:
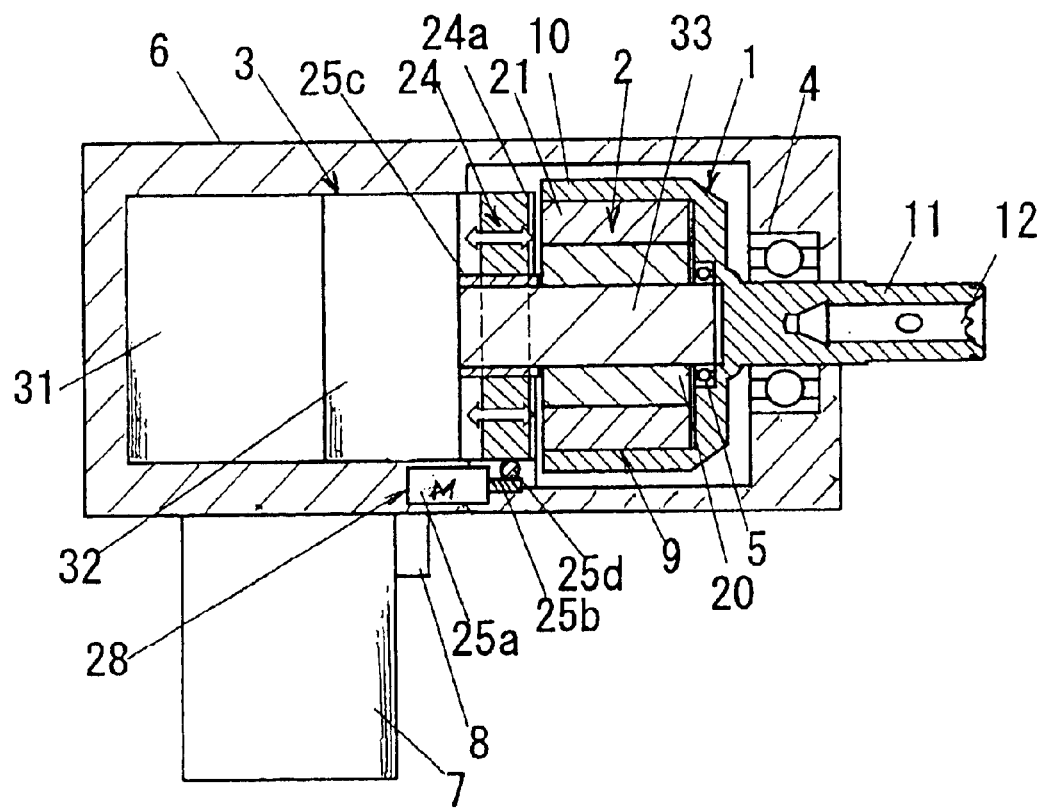
FIG. 2 is a cross-section showing the internal structure of the same.
Figure 3:
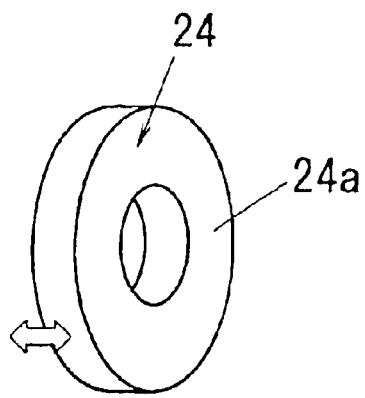
FIG. 3 is a perspective view of the magnetic bypass device of the same.
Figure 15:
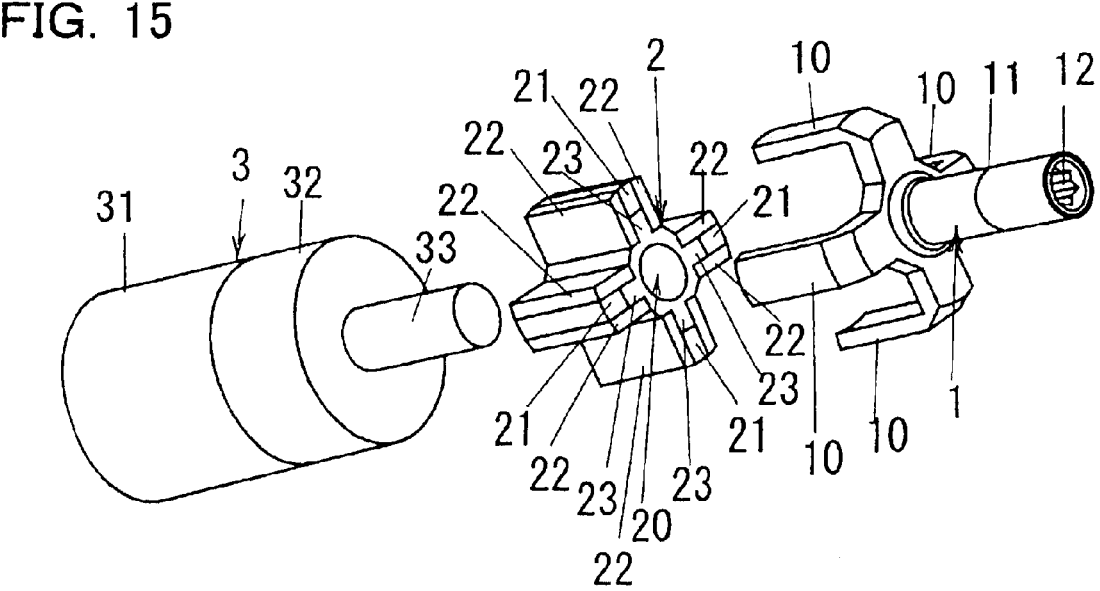
FIG. 15 is an exploded perspective view of the magnetic impact tool that serves as the premise of the present invention.
Figure 16:
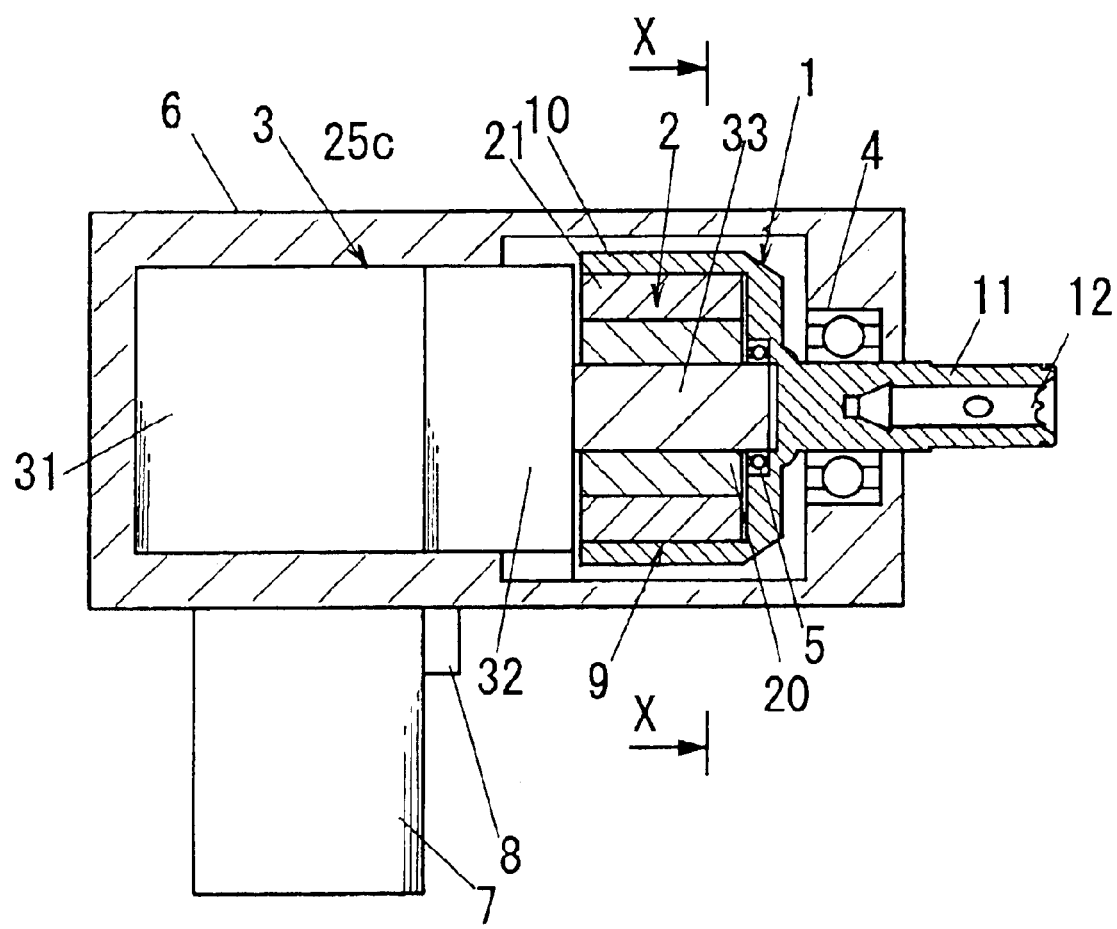
FIG. 16 is a cross-section showing the internal structure of the assembled state of the tool.
Figure 17:
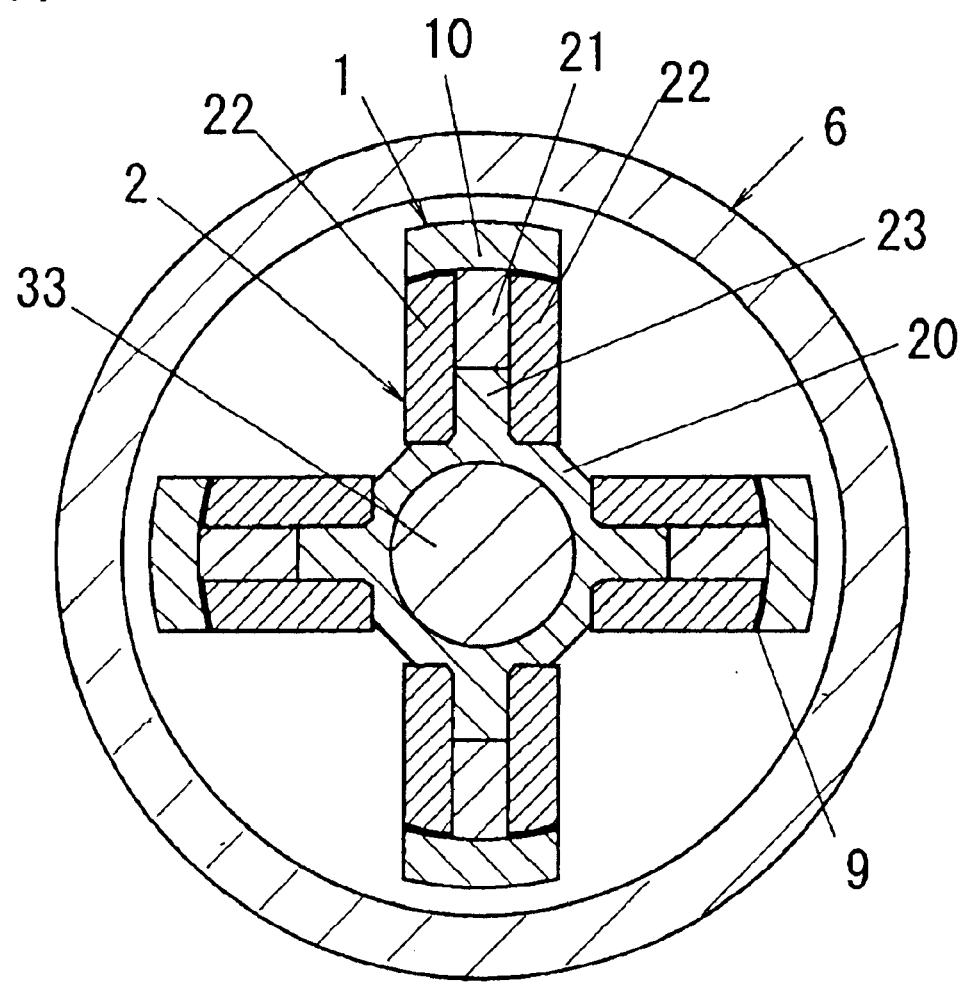
FIG. 17 is a cross-section along the line X—X of FIG. 16.

FIGS. 1 to 3 show a magnetic impact tool (hereinafter referred to as tool) according to the first embodiment of the present invention. The basic structure of this tool is the same as the structure for generating impact torque in a non-contact manner shown in the above-described FIGS. 15 to 17; the same symbols are assigned to common portions and their description is omitted (the same applies hereinafter); and characteristic structures are assigned new symbols and described. This tool comprises a magnetic bypass device 24 for distributing magnetic flux between the magnetic anvil 1 and the magnetic hammer 2, and a changing device 28 for changing the distribution of magnetic flux by the magnetic bypass device 24. In this tool, the distribution ratio of the magnetic flux that flows from the magnetic hammer 2 to the magnetic anvil 1 and the magnetic bypass device 24 can be varied by means of the changing device 28. The torque generated between the magnetic hammer 2 and the magnetic anvil 1 can thereby be changed.

The magnetic bypass device 24 is formed with a plate 24a composed of a magnetic material and provided with a perforated discoid shape (annular shape), and is held on the drive shaft 33 by means of bearings 25c and is inserted into the magnetic hammer 2 without any contact therewith while allowed to move in the axial direction (indicated by white arrows). The changing device 28 comprises a micromotor 25a, and a worm gear 25b and pinion gear 25d rotatably driven thereby. The pinion gear 25d is mounted on the external peripheral surface of the plate 24a. The plate 24a can be moved in a reciprocating manner in the axial direction of the drive shaft 33 by driving the micromotor 25a. Thus, the distribution of magnetic flux between the magnetic hammer 2 and magnetic anvil 1 can be changed, and the torque generated in the magnetic impact tool can therefore be varied by moving the plate 24a composed of magnetic material as part of the magnetic bypass device 24 toward or away from the magnetic hammer 2. A switch for controlling the operation of the micromotor 25a may be combined with the trigger 8 or separately provided to an exterior of the tool.

The tool operates such that when a large magnetic impact torque is required, the operator causes the micromotor 25a to rotate forward, the plate 24a as part of the magnetic bypass device 24 to move away from the magnetic hammer 2, and the amount of magnetic flux that is distributed to the magnetic anvil 1 to be increased. Conversely, when a small magnetic impact torque is required, the micromotor 25a is rotated backward, the plate 24a is brought closer to the magnetic hammer 2, and the amount of magnetic flux that is distributed to the magnetic anvil 1 is reduced. The magnetic impact torque can be varied as desired by appropriately changing the movement distance of the magnetic bypass device 24.

Also, the tool may be configured so that the distance that the magnetic bypass device 24 should move is determined on the basis of the data preprogrammed into the microcomputer, and the operation of the micromotor 25a is controlled, by providing the tool with an input device and a microcomputer (neither depicted) as parts of the changing device 28, and arranging for the operator to input the type of screw and the type of work material (material to be fastened) by way of the input device.

A torque sensor or a rotation sensor may be used as the input means, and the micromotor 25a may be controlled by sensing the load condition with the torque sensor, or by estimating the load condition from the change in the rotational speed of the rotation sensor, and allowing the microcomputer to determine whether it is necessary to switch to a magnetic impact state.

Thus, in the present embodiment, the quantity of magnetic flux that flows from the magnetic hammer 2 to the magnetic anvil 1 can be adjusted, and the torque that is generated between the magnetic hammer 2 and magnetic anvil 1 can be varied by changing the distribution ratio of the magnetic flux that flows from the magnetic hammer 2 to the magnetic anvil 1 and magnetic bypass device 24. Because of this, the magnetic attraction torque can be reduced, and magnetic impact action can be brought about even if the screw-tightening load is small. Also, if the distribution ratio of the magnetic flux flowing to the magnetic bypass device 24 is increased and the distribution ratio of the magnetic flux flowing toward the magnetic anvil 1 is reduced, the magnetic attraction torque is reduced, then the tool can be started even by a motor 31 with a low stalling torque, and the motor 31 can be made smaller. Furthermore, a magnetic impact action can be brought about even with a thin screw, if the distance by which the magnetic bypass device 24 approaches the magnetic hammer 2 is adjusted, hence, the reaction force to the arm can be kept low and screw-tightening work is facilitated.

The plate 24a of the magnetic bypass device 24 is configured to be able to move toward or away from the magnetic hammer 2 in the axial direction of the magnetic hammer 2, so the impact torque can be changed without varying the gap 9 between the magnetic hammer 2 and the magnetic anvil 1. The need to position moving parts for changing the gap 9 in areas that require strength is therefore eliminated, and the configuration can be simplified. Furthermore, the plate 24a is configured to be able to move in the axial direction of the drive shaft 33, so the need for a rotating structure can be eliminated and the configuration simplified.

(Second Embodiment)

Figure 4:
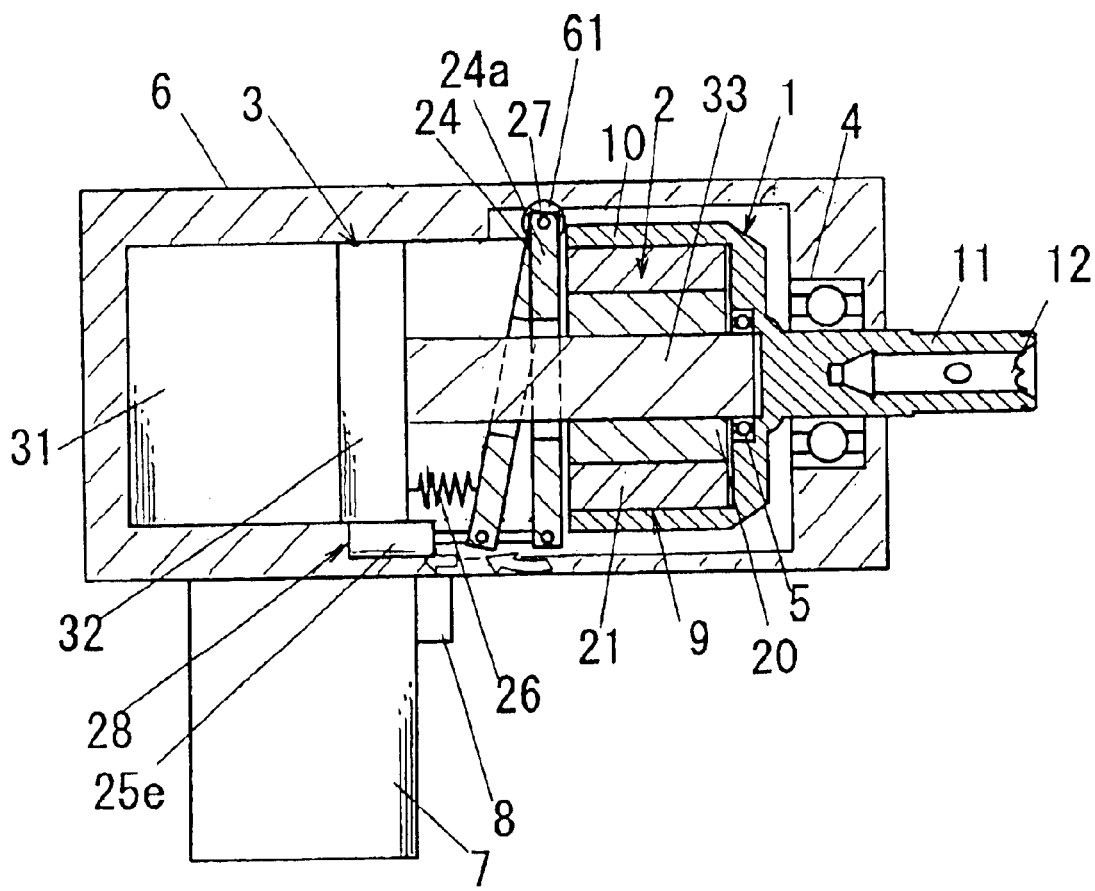
FIG. 4 is a cross-section showing the internal structure of the magnetic impact tool according to the second embodiment of the present invention.
Figure 5:
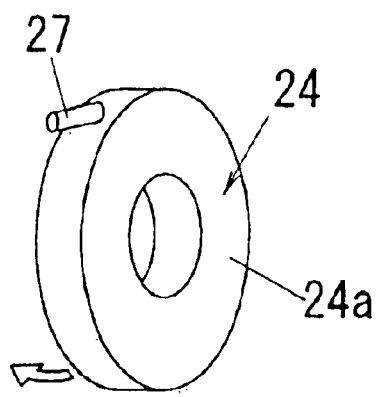
FIG. 5 is a perspective view of the magnetic bypass device of the same.

FIGS. 4 and 5 show a magnetic impact tool according to the second embodiment. In this embodiment, an annular plate 24a composed of a magnetic material as a magnetic bypass device 24 is provided with an enlarged hole diameter, and is mounted with a tolerance on the drive axle 33. The plate 24a has a shaft 27 that is orthogonal to the axial center of the magnetic hammer 2 in a position outside of or on the external periphery of a magnetic hammer 2, and this shaft 27 is rotatably supported by bearings 61 disposed in the case 6. The changing device 28 has a return spring 26 and a solenoid or other direct-acting actuator 25e for causing the plate 24a to tilt. The magnetic flux distribution from the magnetic hammer 2 to the magnetic anvil 1 can be changed and the torque generated on the magnetic anvil 1 varied by tilting the plate 24a with the changing device 28. Here, the plate 24a is tilted by the tensile force of the actuator 25e, and when the drive of the actuator 25e is stopped, the plate is returned to its initial position by the spring force of the return spring 26. The same devices as in the first embodiment may be used in the structure for controlling the actuator 25e.

Thus, in the present embodiment, the need to restrain the plate 24a in a manner such that it moves only in the axial direction of the magnetic hammer 2 is eliminated, and the configuration can be simplified by configuring the plate 24a to tilt about the shaft 27 that is orthogonal to the axial center of the magnetic hammer 2.

(Third Embodiment)

Figure 6:
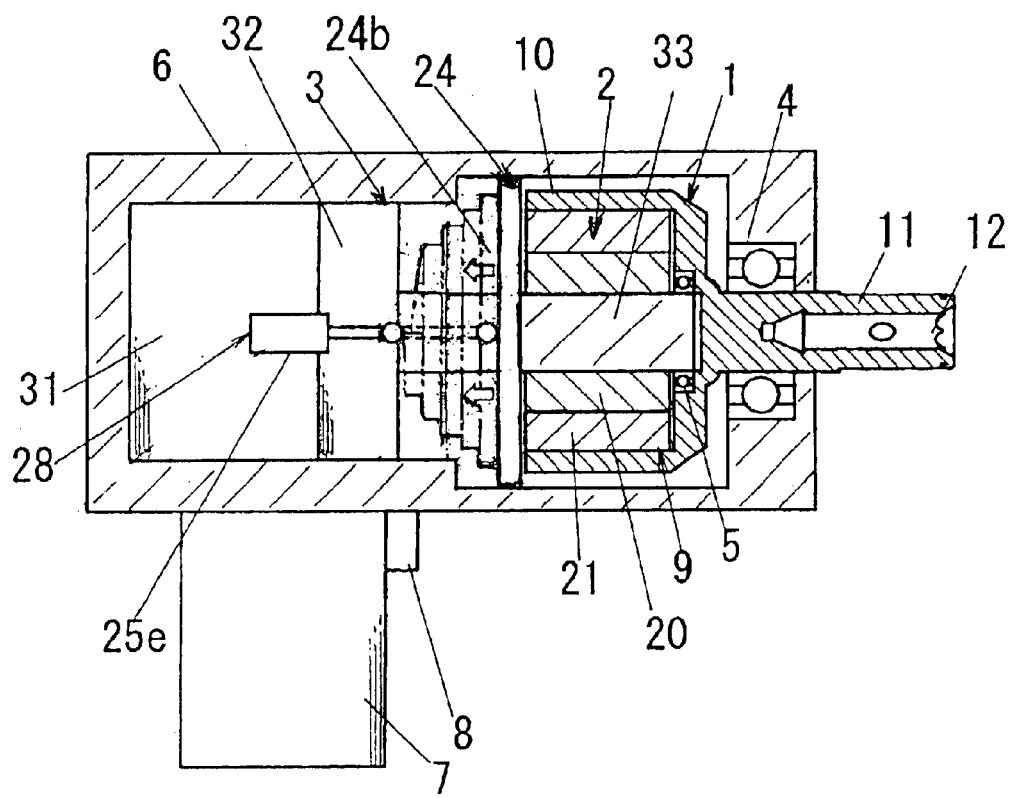
FIG. 6 is a cross-section showing the internal structure of the magnetic impact tool according to the third embodiment of the present invention.
Figure 7:
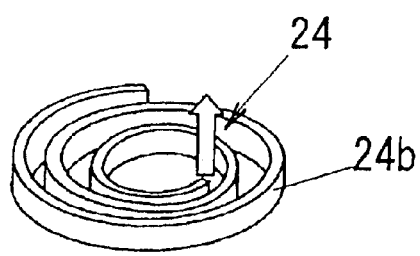
FIG. 7 is a perspective view of the deformable magnetic bypass device of the same.

FIGS. 6 and 7 show a magnetic impact tool according to the third embodiment. In this embodiment, the magnetic bypass device 24 is configured with a spiral spring 24b composed of magnetic material. The internal end portion of the spiral spring 24b has an initial position in the vicinity of the end face of the magnetic hammer 2, and the external end portion of the spiral spring 24b is fixed to the case 6. The changing device 28 is configured with a direct-acting actuator 25e that is linked to the end of the internal end portion of the spiral spring 24b. When the internal end portion of the spiral spring 24b is pulled by the actuator 25e in a direction parallel to the drive shaft 33, the spiral spring 24b can be elastically deformed, then, the distribution of the magnetic flux between the magnetic hammer 2 and magnetic anvil 1 is changed. Consequently, the torque generated on the magnetic anvil 1 can be varied. By reversing the actuator 25e and eliminating the tension force produced by the changing device 28, the spiral spring 24b returns to the initial position by its own spring force. The same devices as in the first embodiment may be used in the structure for controlling the actuator 25e.

Thus, in the present embodiment, the magnetic bypass device 24 is configured in the form of a spiral spring that is deformable in the axial direction of the magnetic hammer 2. The configuration makes the changing device 28 return to the initial position by the elastic force of the spring, hence, the changing device 28 can be simplified.

(Fourth Embodiment)

Figure 8:
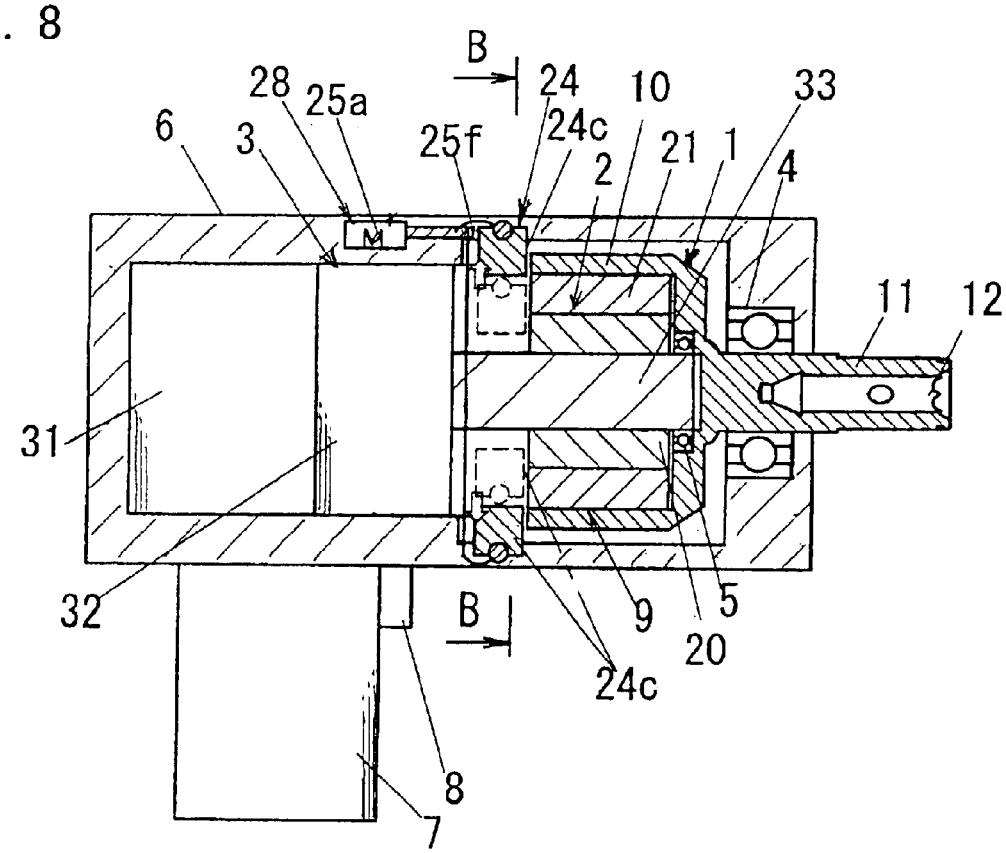
FIG. 8 is a cross-section showing the internal structure of the magnetic impact tool according to the fourth embodiment of the present invention.
Figure 9:
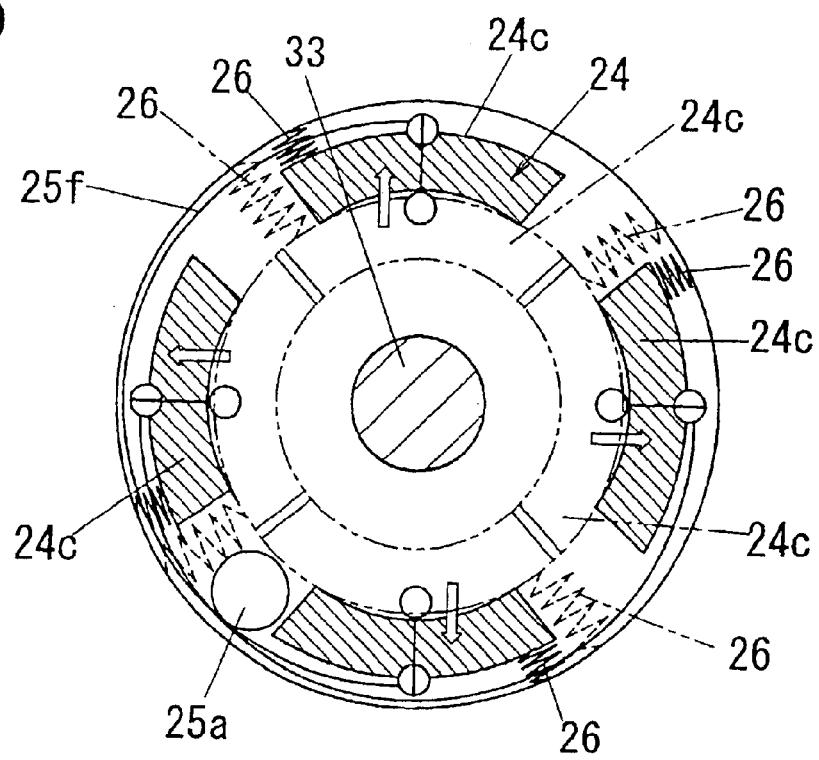
FIG. 9 shows the magnetic bypass device of the same, operating radially in the perpendicular direction to the rotational axis of the hammer, and is a cross-section along the line B—B of FIG. 8.

FIGS. 8 and 9 show a magnetic impact tool according to the fourth embodiment. In this embodiment, the magnetic bypass device 24 is formed into a plurality of arcuate bodies 24c composed of magnetic material so that, for example, four arcuate bodies 24c are urged toward the axial center in the external peripheral portion of the drive shaft 33 by springs 26, the adjacent arcuate bodies 24c come into contact with each other, and a cylindrical shape is formed adjacent to the magnetic hammer 2 (indicated by the imaginary lines). The changing device 28 is configured with a micromotor 25a and a wire 25f attached to the arcuate bodies 24c.

By winding the wire 25f on a drum (not depicted) with the forward rotation of the micromotor 25a, the arcuate bodies 24c can be retracted radially outward along a guide (not depicted) against the resistance of the spring 26 and separated from the magnetic hammer 2 (indicated by the solid lines). When the rotation of the micromotor 25a is reversed and the wire 25f is drawn out, the arcuate bodies 24c are urged to the axial center by the springs 26 and returned to the initial position. In this manner, the distribution of the magnetic flux between the magnetic hammer 2 and magnetic anvil 1 can be changed. The same devices as in the first embodiment may be used in the structure for controlling the micromotor 25a.

As a modification of the above-described embodiment, a configuration may be adopted whereby the arcuate bodies 24c are operated by the centrifugal force of the rotation produced by the motor 31. In this case, the wire 25f should be removed. The micromotor 25a will then be unnecessary, and the configuration can be simplified.

Thus, in the fourth embodiment, the magnetic bypass device 24 is configured to be able to be moved toward or away from the magnetic hammer 2 in a radial direction orthogonal to the axial center of the magnetic hammer 2 by the changing device 28, so the total length of the tool can be shortened, the tool can be made easier to handle, and operability in narrow areas can be improved in comparison with a configuration whereby the magnetic bypass device 24 moves in the axial direction of the magnetic hammer 2.

(Fifth Embodiment)

Figure 10:
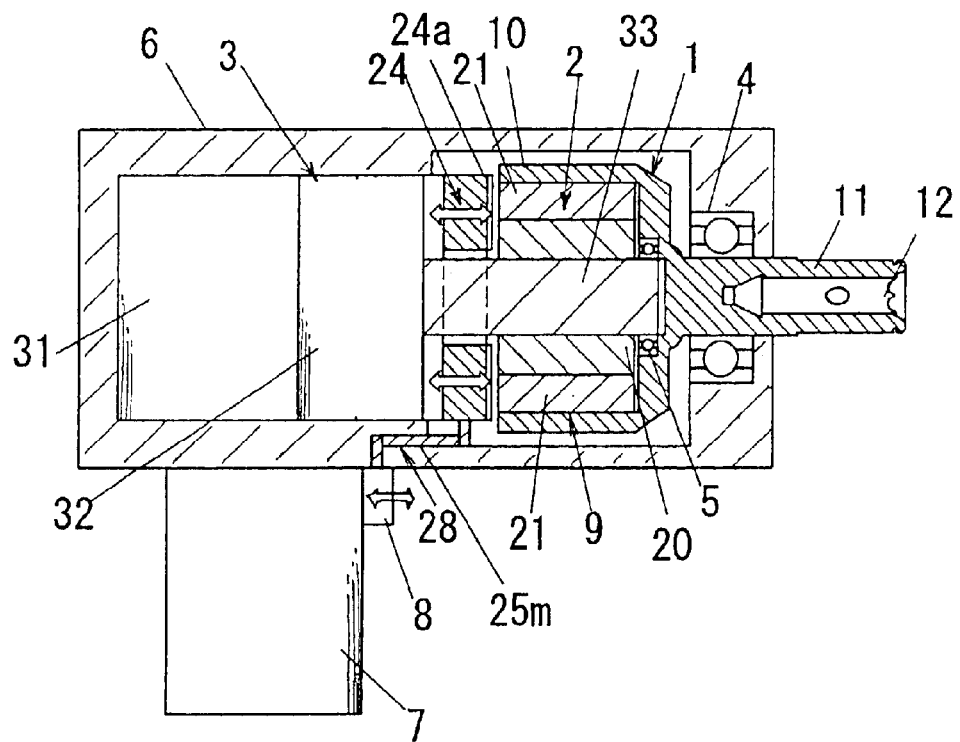
FIG. 10 is a cross-section showing the internal structure of the magnetic impact tool according to the fifth embodiment of the present invention.

FIG. 10 shows a magnetic impact tool according to the fifth embodiment. In this embodiment, the plate 24a of the magnetic bypass device 24 that is the same as the first embodiment is connected to the trigger 8 by way of a crankarm-shaped arm 25m as part of the changing device 28. The plate 24a moves in accordance with the amount that the trigger 8 is pulled, and moves toward or away from the magnetic hammer 2. The arm 25m may be configured as a link mechanism utilizing the principles of the lever, and in this case, the pulling operating force of the trigger 8 can be amplified.

Thus, in the present embodiment, the magnetic impact torque can be freely controlled by operating the trigger 8 for setting the output of the motor 31 in accordance with the intention of the operator. The operator can thereby appropriately work by pulling on the trigger 8 in a manner that increases work efficiency and results from experience while taking into account the characteristics of the materials and the length and thickness of the screw to be used.

(Sixth Embodiment)

Figure 11:
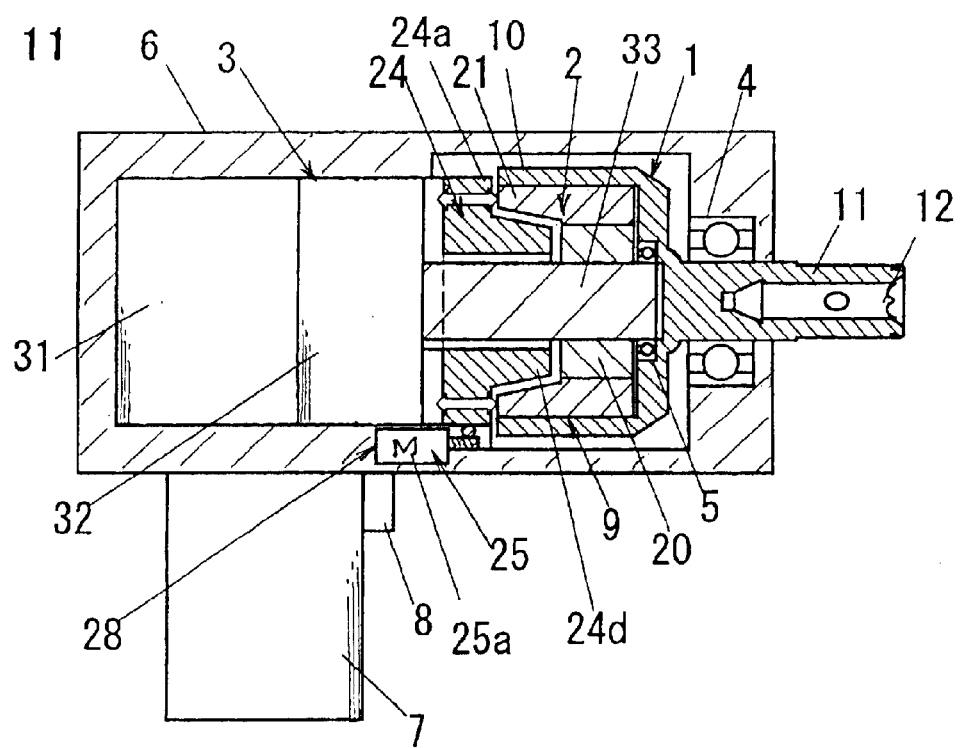
FIG. 11 is a cross-section showing the internal structure of the magnetic impact tool according to the sixth embodiment of the present invention.
Figure 12:
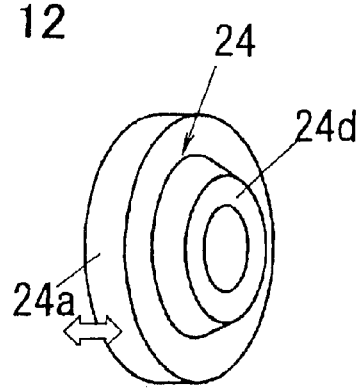
FIG. 12 is a perspective view of the magnetic bypass device of the same.

FIGS. 11 and 12 show a magnetic impact tool according to the sixth embodiment. In this embodiment, the perforated plate 24a that consists of magnetic material and constitutes part of the magnetic bypass device 24 has a perforated conical protruding body 24d composed of magnetic material and made to protrude toward the magnetic hammer 2. The hammer core 20 and magnets 21 of the magnetic hammer 2 that face this protruding body 24d in the direction of the drive shaft 33 take a shape that corresponds to the shape of the protruding body 24d. The magnetic bypass device 24 is configured so as to maintain a minute gap in its most proximate state to the magnetic hammer 2. A mechanism having a micromotor 25a for moving the magnetic bypass device 24 parallel to the drive shaft 33 is used as the changing device 28. The distribution of magnetic flux between the magnetic hammer 2 and magnetic anvil 1 can be changed by moving the plate 24 having such a protruding body 24d in relation to the magnetic hammer 2.

In the present embodiment, the plate 24a of the magnetic bypass device 24 has a conical protruding body 24d, so the opposing surface areas of the magnetic hammer 2 and the magnetic bypass device 24 are increased, and the distribution ratio of the magnetic flux from the magnetic hammer 2 to the magnetic bypass device 24 and magnetic anvil 1 can be varied considerably. The range of magnetic impact torques can thereby be expanded from very low to very high, and the tool can be made to handle work in which the screws range from very thin to very thick. Because of this, there is no need for the operator to carry several types of power tools.

(Seventh Embodiment)

Figure 13:
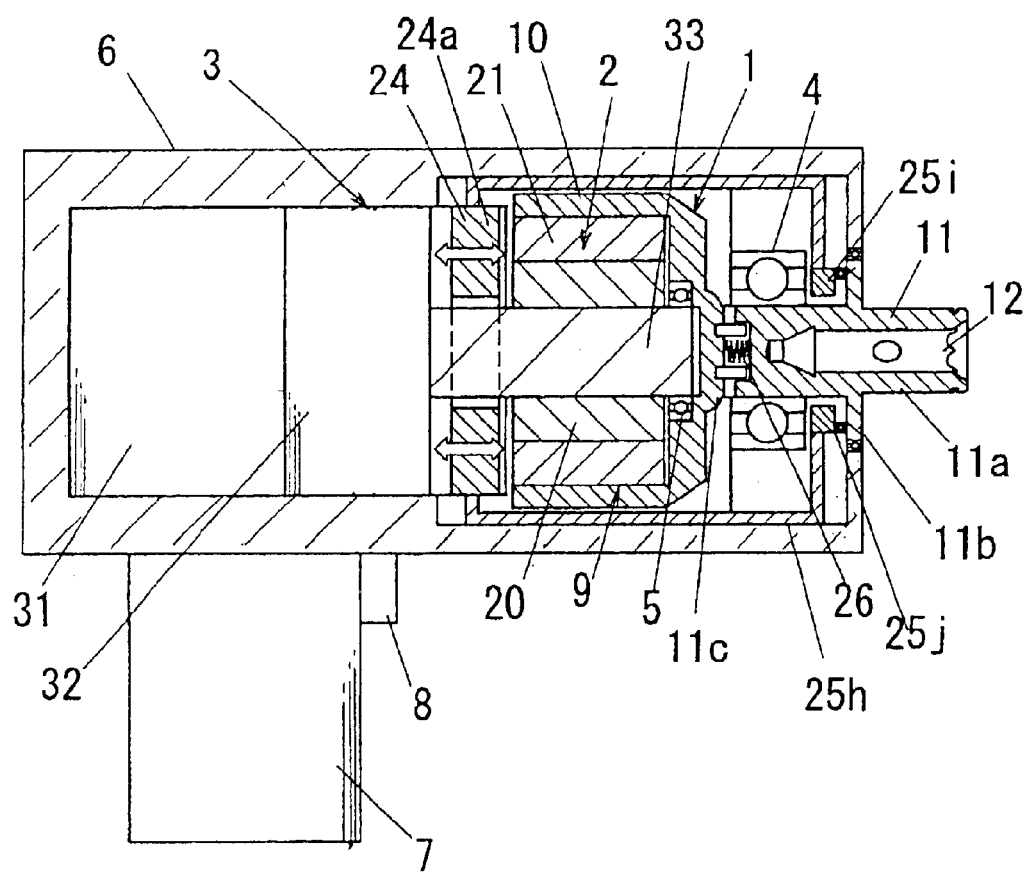
FIG. 13 is a cross-section showing the internal structure of the magnetic impact tool according to the seventh embodiment of the present invention.
Figure 14:
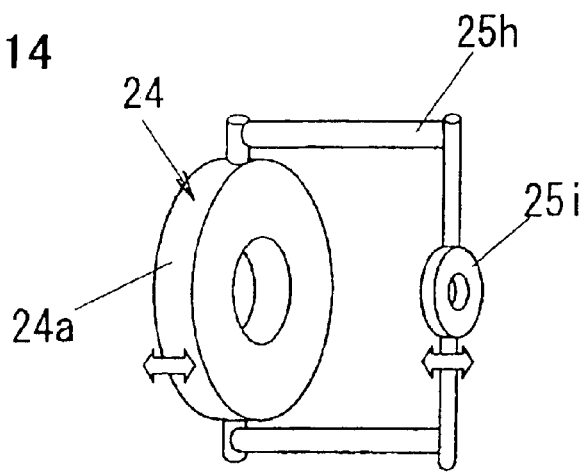
FIG. 14 is a perspective view of the magnetic bypass device of the same.

FIGS. 13 and 14 show a magnetic impact tool according to the seventh embodiment. In this embodiment, a perforated cylindrical plate 24a serving as the magnetic bypass device 24 is configured as a mechanism that is capable of receiving the axial pressing force of the output shaft 11 and moving away from the magnetic hammer 2 and magnetic anvil 1. The changing device for achieving this comprises arms 25h that are connected to the plate 24a and pass on the outside of the magnetic anvil 1, and a cylindrical press-fitted body 25i disposed at the tip of these arms 25h; the output shaft 11 of the magnetic anvil 1 is fashioned into sections 11a and 11c that are bisected in the axial direction; a discoid protruding piece 11b is formed on the bit side of the section 11a; and the pressing force of the tool is transmitted to the press-fitted body 25i by way of rotary bearings 25j. The sections 11a and 11c are linked with a spline mechanism and can move in the axial direction in relation to each other while transmitting rotational torque, a returning spring 26 is mounted between these sections 11a and 11c, and when the pressing force of the tool is released, the section 11a on the tip side is pressed back by the return force of the spring 26, and the plate 24a is thereby returned to the initial position.

In the present embodiment, the plate 24a is moved by the changing device mechanism in accordance with the force with which the tool is pressed in the axial direction when the operator is tightening screws. At this time, when the pressing force of the tool exerted by the operator in the axial direction changes in accordance with magnitude of the tightening torque, the movement distance and movement timing of the magnetic bypass device 24 are changed in accordance with this change. In other words, the magnetic impact torque is increased when the pressing force is high and reduced when the pressing force is low. Thus, the operation of the tool matches the perception of the operator, and the user interface between the operator and the tool is improved.

The present invention is not limited by the configurations of the above-described embodiments, and a variety of modifications can be made within a scope that does not depart from the intent of the present invention.

The present disclosure relates to subject matter contained in Japanese Patent Application No. 2003-086087, filed on Mar. 26, 2003, the contents of which are herein expressly incorporated by reference in its entirety.

What is claimed is:

1. A magnetic impact tool for magnetically generating a rotational impact force in a non-contact manner, comprising:

a motor for generating rotational force, a drive shaft rotatably driven by the motor, a magnetic hammer rotatably moved in a coupled state with the drive shaft, a magnetic anvil which faces the magnetic hammer and to which the rotational force is transmitted by magnetic coupling, with one of the opposing surfaces of the magnetic hammer and magnetic anvil having a magnetic pole, and the other having a magnetic pole or magnetic body;

an output shaft rotated by the magnetic anvil;

a magnetic bypass device that bypasses the magnetic flux between the magnetic anvil and the magnetic hammer, and changes the state of magnetic coupling therebetween, and a changing device that changes the bypass quantity of the magnetic flux with the magnetic bypass device, with the torque transmitted from the magnetic hammer to the magnetic anvil being changed in accordance with the change in bypass quantity of the magnetic flux varied by the changing device.

2. The magnetic impact tool according to claim 1, wherein the magnetic bypass device comprises a magnetic plate, and is configured to allow the plate to be moved toward or away from the magnetic hammer by the changing device.

3. The magnetic impact tool according to claim 2, wherein the plate serving as the magnetic bypass device is configured to be able to move in the axial direction of the drive shaft.

4. The magnetic impact tool according to claim 2, wherein the plate serving as the magnetic bypass device is tiltably supported on a shaft that is orthogonal to the axial center of the magnetic hammer and the shaft is disposed in the outside of or on the external periphery of the magnetic hammer.

5. The magnetic impact tool according to claim 2, wherein the plate serving as the magnetic bypass device takes a substantially conical shape that protrudes toward the magnetic hammer.

6. The magnetic impact tool according to claim 1, wherein the magnetic bypass device takes the form of a spiral spring that is elastically deformable in the axial direction of the magnetic hammer, one end thereof is positioned close to the end face of the magnetic hammer, and the other end thereof is configured to be able to be pulled and moved in the axial direction by the changing device.

7. The magnetic impact tool according to claim 1, wherein the magnetic bypass device is configured to be able to be moved by the changing device toward or away from the magnetic hammer in a radial direction that is orthogonal to the axial center of the magnetic hammer.

8. The magnetic impact tool according to claim 7, wherein the changing device is adapted to act by way of the centrifugal force of the rotation produced by the motor.

9. The magnetic impact tool according to claim 1, wherein the changing device is configured such that the magnetic bypass device moves in coordination with the trigger for setting the output of the motor.

10. The magnetic impact tool according to claim 1, wherein the changing device is configured to allow the movement distance and movement timing of the magnetic bypass device to be set in accordance with the force with which the tool is pressed to the object to be fastened.

* * * * *

UNITED STATES PATENT AND TRADEMARK OFFICE
CERTIFICATE OF CORRECTION

PATENT NO. : 6,918,449 B2
APPLICATION NO. : 10/807255
DATED : July 19, 2005
INVENTOR(S) : S. Shinagawa et al.

Page 1 of 1

It is certified that error appears in the above-identified patent and that said Letters Patent is hereby corrected as shown below:

On the cover of the printed patent, at Item (57), Abstract, lines 15-20, delete "Impact action can be generated, and screw tightening and loosening work can be carried out even if a low-torque motor is used. Magnetic impact action can be carried out and the load applied to operator's arm can be lightened even when working with a low-load screw wherein the load torque does not exceed."

Signed and Sealed this

Fifth Day of February, 2008

JON W. DUDAS
*Director of the United States Patent and Trademark Office*